(12) United States Patent  
Davidkovich et al.

(10) Patent No.: US 7,369,920 B2  
(45) Date of Patent: May 6, 2008

(54) PRESSURE CONTROL SYSTEM WITH OPTIMIZED PERFORMANCE

(75) Inventors: Vladislav Davidkovich, Stoneham, MA (US); Gordon Hill, Arlington, MA (US); Dave Chamberlain, Hooksett, NH (US); Paul Lucas, Melrose, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 11/387,042

(22) Filed: Mar. 21, 2006

(65) Prior Publication Data

US 2007/0225870 A1    Sep. 27, 2007

(51) Int. Cl.
- *G06F 19/00* (2006.01)
- *F04B 40/06* (2006.01)
- *H01L 21/306* (2006.01)
- *C16C 16/52* (2006.01)

(52) U.S. Cl. ............... 700/282; 417/42; 417/44.1; 700/121; 700/275; 700/281; 137/145

(58) Field of Classification Search ........... 700/281, 700/282, 275; 137/145; 417/42, 44.1
See application file for complete search history.

(56) References Cited

U.S. PATENT DOCUMENTS

| | | | |
|---|---|---|---|
| 5,480,809 A * | 1/1996 | Salin et al. | 436/173 |
| 6,739,840 B2 * | 5/2004 | Curry et al. | 417/44.1 |
| 6,966,967 B2 * | 11/2005 | Curry et al. | 156/345.26 |
| 2004/0013531 A1 * | 1/2004 | Curry et al. | 417/42 |

* cited by examiner

*Primary Examiner*—Michael D. Masinick  
(74) *Attorney, Agent, or Firm*—McDermott Will & Emery LLP

(57) ABSTRACT

A pressure control system for controlling pressure of a fluid in a chamber includes a pressure sensor configured to measure the pressure of the fluid in the chamber, and a valve configured to control the pressure of the fluid in the chamber by regulating flow of the fluid from the chamber. The pressure control system further includes a controller. The controller is configured to estimate the volume of the chamber, and to generate a pump speed curve of the valve. The controller is further configured to monitor and modify the pump speed curve so as to maintain a slope of the pump speed curve to at least a minimum value, and to use the modified pump speed curve to adjust the position of the valve in response to pressure measurements by the pressure sensor, so as to maintain the pressure in the chamber at a desired pressure setpoint.

13 Claims, 3 Drawing Sheets

PRESSURE CONTROL SYSTEM WITH OPTIMIZED PERFORMANCE

BACKGROUND

In applications such as semiconductor processing, pressure control systems may be used to control pressure in a chamber. Pressure control valves are typically used, including but not limited to pendulum valves, butterfly valves, and throttle valves.

These valves may be controlled by a controller that uses different control algorithms. In particular, model-based control algorithms may be used that control the valves based on a pressure setpoint trajectory, and make compensations to the valve position to ensure that the actual pressure follows the pressure setpoint trajectory. When model-based control algorithms are used by the valve controller, various system parameters may have to be known, in order to optimize pressure control performance. These system parameters may include, but are not limited to, the volume of the chamber that encloses the fluid whose pressure is being controlled, and the pump speed curve of the valve that charts the pump speed (as controlled by the valve) of the system as a function of valve position.

Pressure control systems may typically require the end user to enter the chamber volume by hand. The user may not know, however, the accurate value of the chamber volume. If an incorrect chamber volume is input by the user, the pressure control performance may be compromised. Sub-optimal pressure control performance may result, including longer settling time, and larger overshoot or undershoot.

The valve controller may gather the actual pump speed curve using the existing algorithm without modification, which may result in the pump speed curve having slopes near zero. The near zero slope may require a high bandwidth of the valve motion controller. The actual bandwidth of the valve motion controller may be limited, however, resulting in an inadequate and oscillatory response.

A system and method are therefore needed for estimating proper chamber volume, and for optimizing the pump speed curve to improve pressure control performance.

SUMMARY

A pressure control system for controlling pressure of a fluid in a chamber includes a pressure sensor configured to measure the pressure of the fluid in the chamber, and a valve configured to control the pressure of the fluid in the chamber by regulating flow of the fluid from the chamber. The pressure control system further includes a controller. The controller is configured to estimate the volume of the chamber, and to generate a pump speed curve of the valve. The controller is further configured to monitor and modify the pump speed curve so as to maintain a slope of the pump speed curve to at least a minimum value, and to use the modified pump speed curve to adjust the position of the valve in response to pressure measurements by the pressure sensor, so as to maintain the pressure in the chamber at a desired pressure setpoint.

A pressure control valve for controlling pressure in a chamber is described. The pump speed curve of the valve may be adjustable by a controller so as to maintain a slope of the pump speed curve to at least a minimum value that is necessary to maintain the pressure in the chamber at a desired pressure setpoint.

A method is described for optimizing performance of a pressure control system that controls pressure of a fluid within a chamber. The pressure control system may include a pressure sensor for measuring pressure of a fluid in a chamber, a valve configured to control the pressure of the fluid in the chamber by regulating flow of the fluid from the chamber, and a controller for the valve. The method may include estimating a volume of the chamber, and generating a pump speed curve of the valve using the estimated volume together with pressure measurements made by the pressure sensor at a plurality of positions of the valve. The method may further include modifying the pump speed curve so that slope of the pump speed curve has a computed minimum value. The method may further include using the modified pump speed curve to adjust the position of the valve as necessary to maintain the pressure in the chamber at a desired pressure setpoint.

DETAILED DESCRIPTION

The pressure control performance of a pressure control system is optimized. The chamber volume is accurately estimated, and the pump speed curve of the pressure control valve is modified to increase near zero slopes to a minimum slope value.

Figure 1:
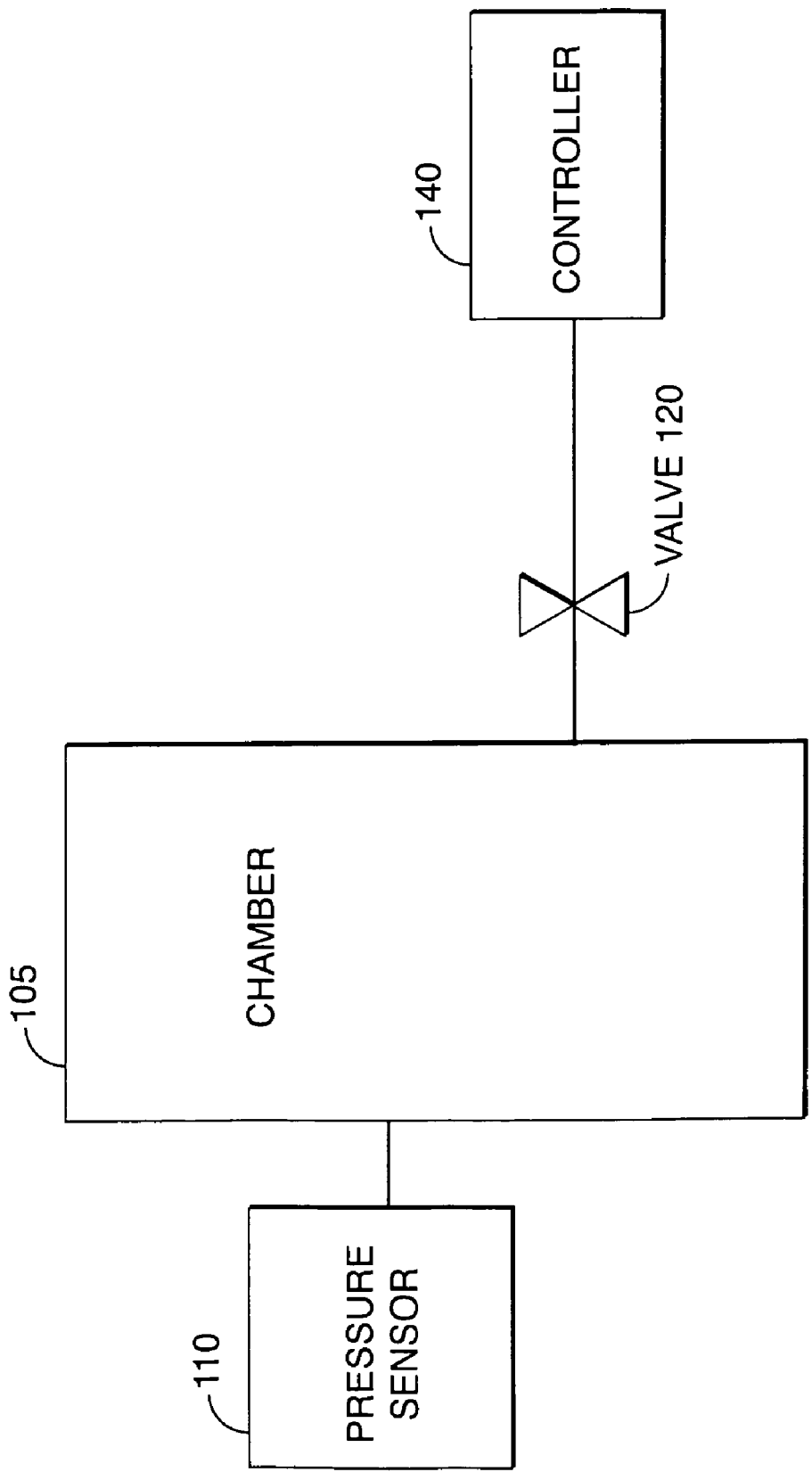
FIG. 1 is a schematic diagram of one embodiment of a pressure control system.

FIG. 1 is a schematic diagram of one embodiment of a pressure control system 100 that controls pressure of a fluid in a chamber 105. In overview, the pressure control system 100 includes a pressure sensor 110 configured to measure the pressure of the fluid in the chamber 105; a valve 120 configured to control the pressure of the fluid in the chamber 105 by regulating the flow of the fluid from the chamber 105; and a controller 140 for the valve 120. The valve 120 regulates the flow of the fluid from the chamber 105 by varying the valve position, i.e. by moving between a fully closed position (minimum fluid throughput) to a fully open position (maximum fluid throughout). A pumping system (not shown) may pump the fluid out of the chamber 105 through the valve.

Many different types of pressure control valves may be used, including but not limited to pendulum valves, butterfly valves, and throttle valves. A pendulum valve is described for example in U.S. Pat. No. 6,776,394, entitled "Pendulum Valve Assembly", commonly owned by the assignee of the current application and incorporated herein by reference in its entirety.

The controller 140 is configured to optimize the pressure control performance of the pressure control system 100, by 1) accurately estimating the volume of the chamber 105, 2) generating a pump speed curve of the valve 120, and 3) optimizing the pump speed curve. In particular, the controller 140 is configured to compute the value of a minimum slope of the pump speed curve that is necessary to maintain the pressure in the chamber at a desired pressure setpoint. The controller 140 monitors and modifies the pump speed curve so as to maintain the slope of the pump speed curve at that minimum slope value.

The pump speed curve charts the throughput of the valve as a function of position of the valve, i.e. the degree to which the valve is open. Typically, the valve may be a gate-type valve, in which the position of the valve gate may be represented by the symbol $\Theta_i$, i=1, . . . max, where $\Theta_1$ represents a fully closed position of the valve, and $\Theta_{max}$ represents a fully open position of the valve.

The specifics of the pump speed curve may change from one system to another. For example, the pump speed curve may change depending on whether a bigger pump or a smaller pump is used. A pressure control system may typically offer a Learn function, which allows the customer to issue a command before running the control system, so that the valve generates a pump speed curve specific to that system.

Volume Estimation

In pressure control systems that require users to manually enter the chamber volume, performance may be degraded if the user does not know the chamber volume, which also includes the piping volume between-the chamber and the valve and makes an inaccurate guess. The pressure control system 100 avoids this problem by accurately estimating the chamber volume, based on pressure dynamics in the chamber 105, without requiring the Learn functions described above.

Initially, the controller 140 calculates the volume V with the valve at a closed position ($\ominus = \ominus_1$), because the pump speed (i.e., the pump speed of the system as controlled by the valve) at the closed position, $C(\ominus_1)$, is a known value. $C(\ominus_1)$ is determined by design, such as mechanical design and tolerances, by way of example. $C(\ominus_1)$ typically has a small, non-zero value (soft-closed valve). Alternatively, $C(\ominus_1)$ may be zero (hard sealed valve). The controller 140 then uses the equation that describes the pressure dynamics in the chamber 105, in order to compute the volume for other valve positions ($\ominus_i$, i=1, . . . , max) for which the pump speed is not know. In particular, the chamber volume can be estimated based on the pressure dynamics described as:

$$V\frac{dP}{dt} = Q_i - C(\theta)P, \quad (1)$$

where P denotes the pressure of the fluid in the chamber (in units of Torr, for example);
dP/dt denotes a time derivative of the pressure,
V denotes the volume of the chamber,
$Q_i$ denotes mass flow rate of the fluid into the chamber,
$\ominus$ denotes the position of the valve and ranges from $\ominus = \ominus_1$ when the valve is fully closed to $\ominus = \ominus_{max}$ when the valve is fully open;
$C(\ominus)$ denotes the pump speed as a function of the position $\ominus$ of the valve (in units of liters/sec, for example); and
$C(\ominus) * P$ denotes mass flow rate of the fluid from the chamber.

The controller 140 approximates the pressure dynamics equation by substituting the time derivative of the pressure dP/dt by a pressure differential $\Delta P$ during a discrete time interval $\Delta t$, where $\Delta P = P_n - P_{n-1}$, $P_n$=pressure measured by the pressure sensor at a time $t_n$, $P_{n-1}$=pressure measured by the pressure sensor at a time $t_{n-1}$, and $\Delta t = t_n - t_{n-1}$.

The controller 140 uses the approximated equation to estimate the volume V, by using the known value $C(\ominus_1)$ of the pump speed of the valve at the fully closed position of the valve, together with pressure measurements $P_n$ and $P_{n-1}$ provided by the pressure sensor, and computing the volume V in accordance with the following equation:

$$V = \frac{(Q_i - C(\theta_1)P_n)\Delta t}{P_n - P_{n-1}}. \quad (2)$$

In the above equation, the subscript n corresponds to the reading taken at the $n^{th}$ time point. The volume estimation described above may be more accurate if the data samples are taken with $\Delta t = 100$ ms apart and then averaged. For 20 data samples at 10 ms apart, this means computing the differences as $P_{11}-P_1$, $P_{12}-P_2$, etc.

Generating the Pump speed curve

Using the estimated volume of the chamber, the controller 140 may generate the pump speed curve of the valve 120. First, the valve 120 may be moved to a fully open position, and the pressure in the chamber may be allowed to stabilize. The gate may then be moved to a fully closed position, i.e. the valve position will be at 0% open. At this initial position, the controller 140 causes the pressure sensor to take a plurality (11, by way of example) of pressure measurements, as the pressure rises within the chamber with the valve closed. The pressure data are stored.

The gate may then be moved in increments. For example, the gate may first be moved in 1% increments up to 20%, then in 2% increments, and then in 5% and 10% increments. Of course, the valve position may be moved many different increments. The gate valve thus travels from a fully closed position to a fully open position. At each valve position, the pressure sensor takes pressure data as the pressure changes dynamically. The pressure data are stored in memory.

The controller 140 may then calculate the pump speed $C(\ominus_i)$ at each valve position $\ominus_i$, thereby generating the actual pump speed curve. In particular, the controller 140 may be configured to compute $C(\ominus_i)$ at each $\ominus_i$ by causing the pressure sensor to generate pressure measurements $P_n$ (n=1, . . . N) at each one of a plurality N of time points $t_n$ (n=1 . . . . N), then computing at each time point $t_n$ the value of the pump speed $C(\ominus_i)_n$ at $t_n$ using an equation given by:

$$C(\theta_i)_n \cong \frac{1}{P_n}\left(Q_i - V\frac{P_n - P_{n-1}}{\Delta t}\right). \quad (3)$$

Finally, the controller 140 may average over the values of the pump speed for all N of the time points $t_n$ (n=1, . . . N), to obtain $C(\ominus_i)$, as follows:

$$C(\theta_i) = \frac{1}{N}\sum_{k=1}^{N} C(\theta_i)_k. \quad (4)$$

Modifyinq the Pump speed curve

After obtaining the valve pump speed curve, the controller 140 may modify the pump speed curve to improve and optimize the pressure control performance by the pressure control system 100. In particular, the controller 140 may modify the pump speed curve to guarantee a minimum value of soft-closed (i.e. non-zero $C(\ominus_1)$ ) pump speed, and to guarantee a minimum curve slope for better control performance.

Figure 2A:
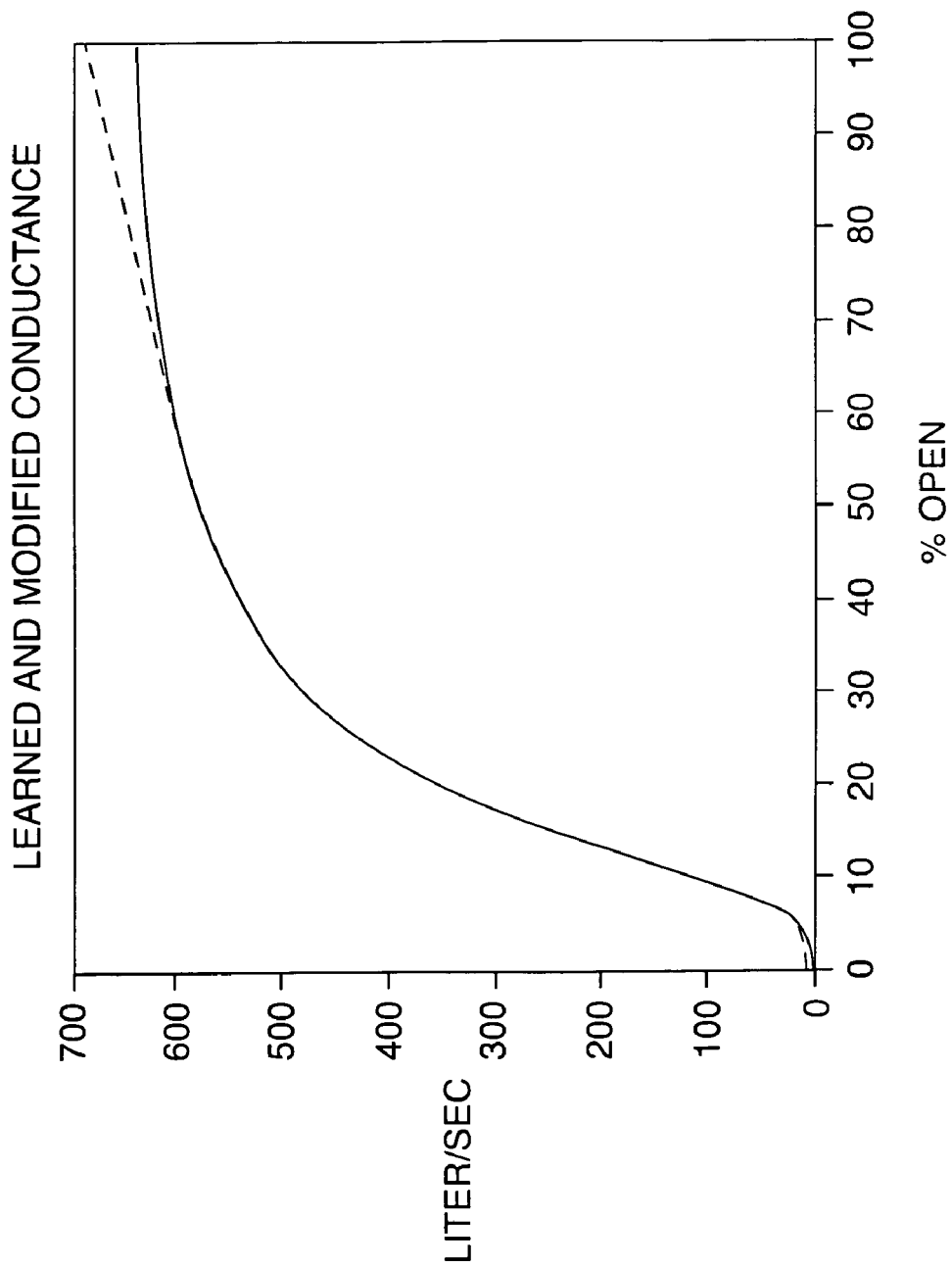
FIGS. 2A and 2B illustrate valve pump speed curve, as modified in accordance with one embodiment of the system and method described in the present disclosure.
Figure 2B:
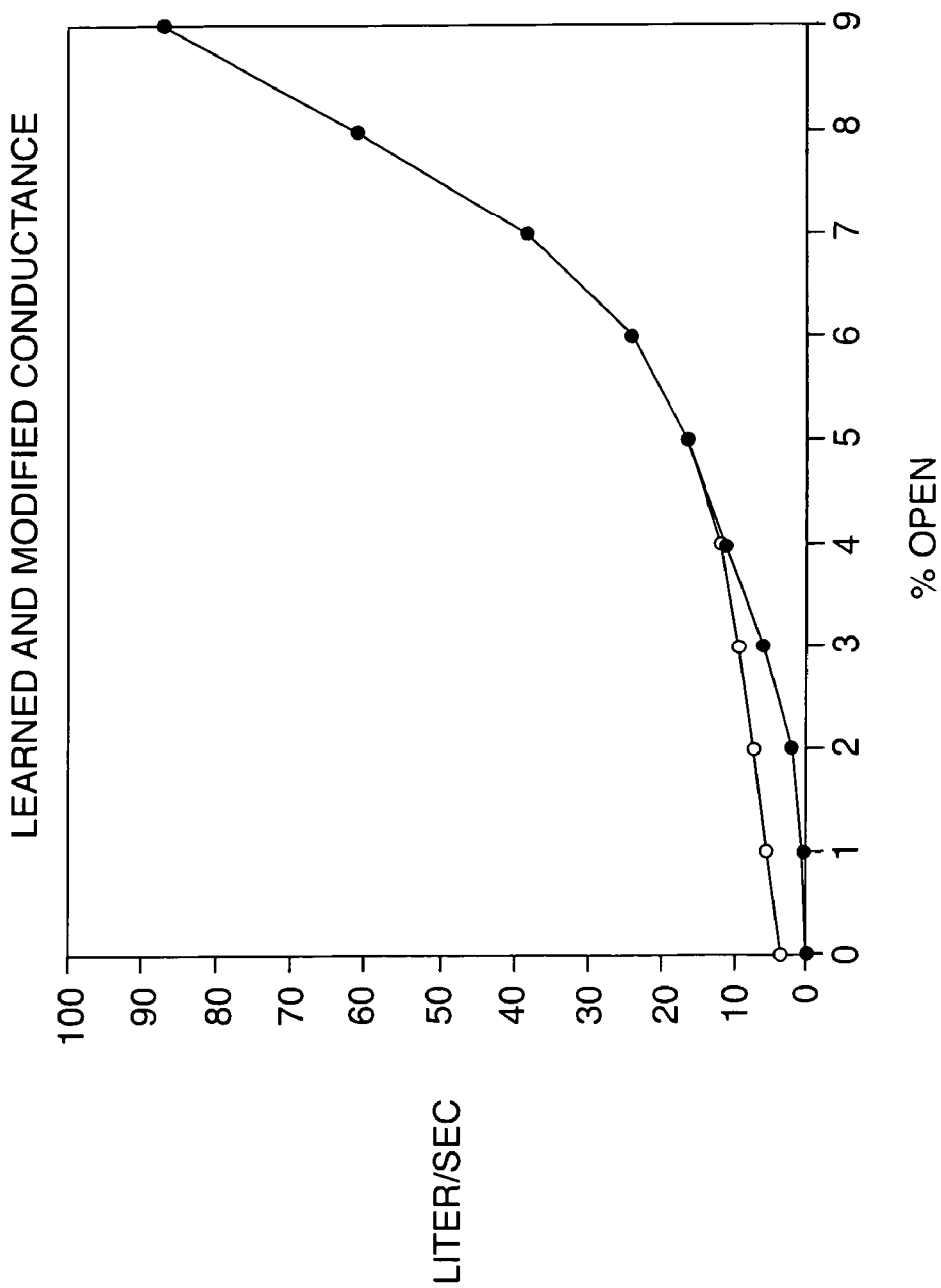

FIGS. 2A and 2B illustrate valve pump speed curves, as modified in accordance with one embodiment of the system and method described in the present disclosure.

Typically, as the position of the valve goes from a fully closed position to a fully open position, the pump speed curve should become a monotonically changing, monotonically rising curve. Due to limitations of the pump, however, or other measurement inaccuracies, the pump speed curve may actually saturate, to become much more horizontal with a near-zero slope.

The controller 140 is configured to compute the position of the valve for which the pump speed that results in a pressure value that is at the pressure set point determined by the particular model-based control algorithm. Typically, the end user sets the pressure set point, and the controller 140 adjusts the position of the valve so that the actual pressure matches the pressure set point set by the end user.

There are practical limitations on how fast the gate valve can be moved. These limitations may include, but are not limited to the maximum torque that the motor can produce, and the weight of the gate. Because of these limitations, if the pressure control system happens to operate in the region of the pump speed curve that is rather flat, unsatisfactory performance may result. The valve may just move back and forth, trying to reach certain steady state position, and being unsuccessful, because the required bandwidth of the valve movement is higher than it can possibly do.

To overcome these problems, the controller 140 modifies the pump speed curve by increasing the slope of the pump speed curve to at least a minimum slope value, which the controller 140 computes. By increasing the slope of the pump speed curve, the valve 120 is made to move smoother and slower, as it approaches the pressure set-point.

If the curve is horizontal, even a very small change in pump speed translates into requiring a huge valve movement, which causes the valve to overshoot. The gate may end up with too much movement, and the pressure may oscillate about the pressure set point. If a big valve tries to move too much, shaking and vibrations may result.

By introducing some slope into the curve, the gate movement may be reduced, since the valve speed is limited. As a result, a much more stable control may be achieved. After applying the above-described minimum slope criteria to the pump speed curve, the controller 140 may save the modified pump speed curve in memory.

In one embodiment, the controller 140 may compute the minimum slope of the pump speed curve, which may be proportional to the differences of two pump speeds, at fully open and fully closed. The controller 140 may compute the minimum slope $m_{min}$ using the following equation:

$$m_{min} = [C(\Theta_{max}) - C(\Theta_1)] * k. \qquad (5)$$

In the above equation, the coefficient k may be an empirical coefficient, and may relate to the existing bandwidth of the pressure control system.

The controller 140 may then check whether the slope of the curve is larger than the minimum slope that the controller 140 computes as described above, based on the 0% value and the 100% value pump speeds. Going from point to point, the controller 140 verifies the slope of the pump speed curve. If the slope is larger than the minimum slope, the curve is not modified. If the slope is smaller, the curve is modified to increase the slope at that point.

In other words, for each position $\Theta_i$ where i ranges from i=1 to i=max, the controller 140 may compare the pump speed $C(\Theta_i)$ to the known value $C(\Theta_1)$, and if $C(\Theta_i)$ is less than $C(\Theta_1)$, set $C(\Theta_i) = C(\Theta_1)$.

For each position $\Theta_i$ where i ranges from i=2 to i=max, the controller 140 may compute the slope of the pump speed curve at that position. If the computed slope is less than the minimum value $m_{min}$, setting $C(\Theta_i) = C(\Theta_{i-1}) + m_{min} * (\Theta_i - \Theta_{i-1})$. The slope of the pump speed curve may be computed using the following equation:

$$\text{slope} = [C(\Theta_i) - C(\Theta_{i-1})]/(\Theta_i - \Theta_{i-1})]. \qquad (6)$$

The pressure setpoint may be fixed, in which case the pressure control system operates in a steady state. At steady state, a steeper slope may allow for less movement of the valve, which may be beneficial.

Alternatively, the desired pressure setpoint may be variable, in which case the pressure control system may monitor a transient response of the pressure of the fluid in the chamber, as the set point changes. In this case, too steep a slope may slow down the pressure control system.

In sum, optimizing performance is described of a pressure control system that controls pressure of a fluid within a chamber. The volume of the chamber is estimated, and a pump speed curve of the valve is generated, using the estimated volume together with pressure measurements made at a plurality of positions of the valve. A minimum value of the slope of the pump speed curve is computed that is necessary to maintain the pressure in the chamber at a desired pressure setpoint. The pump speed curve is monitored and modified so as to maintain the slope of the pump speed curve to at least the minimum value. Pressure control performance is thereby stabilized and optimized.

While certain embodiments have been described of systems and methods for optimizing pressure control performance of a pressure controller, it is to be understood that the concepts implicit in these embodiments may be used in other embodiments as well. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A pressure control system for controlling pressure of a fluid in a chamber, comprising:
    a pressure sensor configured to measure the pressure of the fluid in the chamber;
    a valve configured to regulate flow of the fluid from the chamber by moving between an open position and a closed position; and
    a computer processor configured to generate a pump speed curve of the valve, wherein the pump speed curve shows the pump speed C of the system as controlled by the valve and as a function of position $\Theta$ of the valve, the computer processor further configured to monitor and modify the pump speed curve so as to maintain a slope of the pump speed curve to at least a minimum value, the computer processor further configured to use the modified pump speed curve to adjust the position of the valve in response to pressure measurements by the pressure sensor, so as to maintain the pressure in the chamber at a desired pressure setpoint, the computer processor further configured to estimate a volume of the chamber, and to generate the pump speed curve using the estimated volume together with pressure measurements made by the pressure sensor at a plurality of positions of the valve.

2. The pressure control system of claim 1, wherein the computer processor is further configured to estimate the volume of the chamber based on pressure dynamics in the chamber, the pressure dynamics described by:

$$V \frac{dP}{dt} = Q_i - C(\theta)P,$$

where P denotes the pressure of the fluid in the chamber, $$\frac{dP}{dt}$$

denotes a time derivative of the pressure,

V denotes the volume of the chamber, $Q_i$ denotes flow rate of the fluid into the chamber, $\Theta$ denotes the position of the valve and ranges from $\Theta=\Theta_1$ when the valve is fully closed to $\Theta=\Theta_{max}$ when the valve is fully open;

$C(\Theta)$ denotes the pump speed of the system as controlled by the valve as a function of the position $\Theta$ of the valve; and $C(\Theta) * P$ denotes flow rate of the fluid from the chamber.

3. The pressure control system of claim 2, wherein the computer processor is configured to approximate the pressure dynamics equation by substituting the time derivative of the pressure $$\frac{dP}{dt}$$

by a pressure differential $\Delta P$ during a discrete time interval $\Delta t$, where $\Delta P = P_n - P_{n-1}$, $P_n$ = pressure measured by the pressure sensor at a time $t_n$, $P_{n-1}$ = pressure measured by the pressure sensor at a time $t_{n-1}$, and $\Delta t = t_n - t_{n-1}$; and wherein the computer processor is further configured to estimate the volume $V_c$ by using a known value $C(\Theta_1)$ of the pump speed at the fully closed position of the valve, together with pressure measurements $P_n$ and $P_{n-1}$ provided by the pressure sensor, and computing the volume V according to an equation given by;

$$V = \frac{(Q_i - C(\theta_1)P_n)\Delta t}{P_n - P_{n-1}}.$$

4. The pressure control system of claim 3, wherein the computer processor is further configured to generate the pump speed curve by:

positioning the valve at each one of a plurality of valve positions $\Theta_i (i=1, \ldots, max)$, where $\Theta_1$ represents the fully closed position of the valve, and $\Theta_{max}$ represents the fully open position of the valve; and at each valve position $\Theta_i$, computing the pump speed $C(\Theta_i)$ at that valve position.

5. The pressure control system of claim 4, wherein the computer processor is configured to compute $C(\Theta_i)$ at each $\Theta_i$ by:

causing the pressure sensor to generate pressure measurements $P_n$ (n=1, ... N) at each one of a plurality N of time points $t_n(n=1, \ldots N)$;

computing at each time point $t_n$ the value of the pump speed $C(\Theta_i)_n$ at $t_n$ using an equation given by;

$$C(\theta_i)_n \cong \frac{1}{P_n}\left(Q_i - V\frac{P_n - P_{n-1}}{\Delta t}\right);$$

and averaging over the values of the pump speed for all N of the time points $t_n$ (n=1, ... N), to obtain $C(\Theta_i)$, given by:

$$C(\theta_i) = \frac{1}{N}\sum_{k=1}^{N} C(\theta_i)_k.$$

6. The pressure control system of claim 1, wherein the computer processor is further configured to compute the minimum value of the slope of the pump speed curve that is necessary to maintain the pressure in the chamber at the desired pressure setpoint.

7. The pressure control system of claim 6, wherein the computer processor is further configured to compute the minimum value of the slope using an equation given by:

$$M_{min}=[C(\Theta_{max}) C(\Theta_1)]* k,$$

where k is an empirical coefficient;

$M_{min}$ represents the minimum value of the slope of the pump speed curve;

$C(\Theta_{max})$ represents the pump speed at the valve position $\Theta_{max}$ at which the valve is fully open, and $C(\Theta_1)$ represents the pump speed at the valve position $\Theta_1$ at which the valve is fully closed.

8. The pressure control system of claim 7, wherein the computer processor is further configured to monitor and modify the pump speed curve by:

for each position $\Theta_i$ where i ranges from i=1 to i=max, comparing the pump speed $C(\Theta_i)$ to the known value $C(\Theta_1)$, and if $C(\Theta_i)$ is less than $C(\Theta_1)$, setting $C(\Theta_i)=C(\Theta_1)$;

for each position $\Theta_i$ where i ranges from i=2 to i=max, computing the slope of the pump speed curve at that position, and if the computed slope is less than the minimum value $M_{min}$, setting $C(\Theta_i)=C(\Theta_{i-1}) +M_{min}* (\Theta_i-\Theta_{i-1})$, wherein the slope of the pump speed curve is computed using the following equation:

$$slope=[C(\Theta_i) -C(\Theta_{i-1}) ]/(\Theta_i-\Theta_{i-1}) ].$$

9. The pressure control system of claim 3, wherein the known value of $C(\Theta_1)$ is zero.

10. The pressure control system of claim 3, wherein the known value of $C(\Theta_1)$ is nonzero.

11. The pressure control system of claim 1, wherein the desired pressure setpoint is fixed, and the pressure control system operates in a steady state.

12. The pressure control system of claim 1, wherein the desired pressure setpoint is variable, and the pressure control system follows the pressure setpoint.

13. A method of optimizing performance of a pressure control system for controlling pressure of a fluid within a chamber, the pressure control system including a pressure sensor for measuring pressure of a fluid in a chamber, a valve configured to control the pressure of the fluid in the chamber by regulating flow of the fluid from the chamber, and a computer processor configured to control position of the valve, the method comprising:

estimating a volume of the chamber;

generating a pump speed curve of the valves using the estimated volume together with pressure measurements made by the pressure sensor at a plurality of positions of the valve;

modifying the pump speed curve so that slope of the pump speed curve has a computed minimum value; and using the modified pump speed curve to adjust the position of the valve as necessary to maintain the pressure in the chamber at a desired pressure setpoint.

* * * * *